United States Patent
Schussmann et al.

(10) Patent No.: US 10,231,123 B2
(45) Date of Patent: Mar. 12, 2019

(54) BLUETOOTH LOW ENERGY (BLE) COMMUNICATION BETWEEN A MOBILE DEVICE AND A VEHICLE

(71) Applicant: GM Global Technology Operations LLC, Detroit, MI (US)

(72) Inventors: Jennifer J. Schussmann, Whitby (CA); Lynn Saxton, Los Alamos, NM (US); Alessandro Testa, White Rock, NM (US); David K. Sayre, White Rock, NM (US); Karl B. Leboeuf, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/961,750

(22) Filed: Dec. 7, 2015

(65) Prior Publication Data

US 2017/0164192 A1 Jun. 8, 2017

(51) Int. Cl.
| | |
|---|---|
| *H04L 29/06* | (2006.01) |
| *H04W 12/06* | (2009.01) |
| *H04W 76/14* | (2018.01) |
| *H04W 4/80* | (2018.01) |
| *H04L 29/08* | (2006.01) |
| *H04W 8/00* | (2009.01) |
| *H04W 12/02* | (2009.01) |
| *H04W 12/04* | (2009.01) |
| *H04W 12/12* | (2009.01) |

(52) U.S. Cl.
CPC ............. *H04W 12/06* (2013.01); *H04L 67/12* (2013.01); *H04W 4/80* (2018.02); *H04W 8/005* (2013.01); *H04W 12/02* (2013.01); *H04W 12/04* (2013.01); *H04W 12/12* (2013.01); *H04W 76/14* (2018.02)

(58) Field of Classification Search
CPC ... H04W 12/06; H04W 4/008; H04W 76/023; H04W 8/005; H04W 76/14; H04W 4/80; H04W 12/12; H04W 12/02; H04W 12/04; H04L 67/12
See application file for complete search history.

(56) References Cited

U.S. PATENT DOCUMENTS

| | | | | |
|---|---|---|---|---|
| 5,497,421 | A * | 3/1996 | Kaufman | G06F 21/335 380/28 |
| 5,535,276 | A * | 7/1996 | Ganesan | H04L 9/0825 380/46 |
| 5,737,419 | A * | 4/1998 | Ganesan | H04L 9/083 380/286 |

(Continued)

OTHER PUBLICATIONS

Bluetooth Specification Version 4.0, Bluetooth, Jun. 2010.*

*Primary Examiner* — David Garcia Cervetti
(74) *Attorney, Agent, or Firm* — David Willoughby; Reising Ethington P.C.

(57) ABSTRACT

A system and a method for communicating over a Bluetooth Low Energy (BLE) connection in a vehicle. The method includes the steps of: establishing a Bluetooth Low Energy (BLE) connection between a mobile device and a BLE system in the vehicle, wherein the establishing step includes receiving first credentials of the mobile device at the BLE system; providing second credentials to the mobile device from the vehicle, wherein the second credentials are different than the first credentials; and receiving a message from the mobile device that is encrypted using the first and second credentials.

14 Claims, 3 Drawing Sheets

(56) References Cited

U.S. PATENT DOCUMENTS

| | | | | |
|---|---|---|---|---|
| 7,607,012 B2* | 10/2009 | Nyberg | H04L 9/0844 | 380/33 |
| 8,190,695 B2 | 5/2012 | Rekimoto | G08C 17/02 | 709/208 |
| 8,526,606 B2* | 9/2013 | Muthaiah | H04L 9/0825 | 380/270 |
| 8,687,800 B2* | 4/2014 | Patel | H04L 9/0637 | 380/28 |
| 8,892,887 B2* | 11/2014 | Perez | H04L 9/0869 | 713/169 |
| 9,319,877 B2* | 4/2016 | Ando | H04W 12/04 | |
| 9,445,270 B1* | 9/2016 | Bicket | H04W 4/70 | |
| 9,619,770 B2* | 4/2017 | Bisroev | G06F 3/0481 | |
| 9,619,771 B2* | 4/2017 | Rao | G06F 3/0481 | |
| 9,644,399 B2* | 5/2017 | Johnson | G07C 9/00571 | |
| 9,647,996 B2* | 5/2017 | Johnson | H04L 63/0428 | |
| 9,838,876 B2* | 12/2017 | Dinan | H04W 4/029 | |
| 9,900,292 B2* | 2/2018 | Lee | H04L 63/06 | |
| 10,009,763 B2* | 6/2018 | Benoit | H04L 63/062 | |
| 10,097,524 B2* | 10/2018 | Li | H04L 63/061 | |
| 2002/0062451 A1* | 5/2002 | Scheidt | G06F 21/31 | 726/7 |
| 2003/0056118 A1* | 3/2003 | Troyansky | H04L 9/0822 | 726/5 |
| 2003/0149876 A1* | 8/2003 | McGough | H04L 9/0844 | 713/171 |
| 2005/0111666 A1* | 5/2005 | Blom | H04L 63/0428 | 380/277 |
| 2005/0273609 A1* | 12/2005 | Eronen | H04L 63/0428 | 713/171 |
| 2006/0190726 A1* | 8/2006 | Brique | G06F 21/445 | 713/168 |
| 2007/0040651 A1* | 2/2007 | Jung | H04L 63/08 | 340/5.74 |
| 2007/0053520 A1* | 3/2007 | Eckleder | H04L 9/0822 | 380/278 |
| 2008/0108307 A1* | 5/2008 | Yeh | G01S 5/0252 | 455/41.2 |
| 2008/0114982 A1* | 5/2008 | Bleumer | G07B 17/00733 | 713/171 |
| 2009/0100267 A1* | 4/2009 | Brown | H04L 9/3066 | 713/176 |
| 2009/0237206 A1* | 9/2009 | Anderson | B60R 25/23 | 340/5.72 |
| 2010/0306542 A1* | 12/2010 | Funk | H04L 9/0822 | 713/171 |
| 2011/0086678 A1* | 4/2011 | Suzuki | H04M 1/6091 | 455/569.2 |
| 2011/0113254 A1* | 5/2011 | Livesey | H04L 9/0656 | 713/176 |
| 2011/0177780 A1* | 7/2011 | Sato | H04W 36/14 | 455/41.1 |
| 2011/0264916 A1* | 10/2011 | Fischer | G07C 5/008 | 713/175 |
| 2011/0296190 A1* | 12/2011 | Paeschke | B60R 13/10 | 713/176 |
| 2012/0007712 A1* | 1/2012 | Tung | B60R 25/243 | 340/5.72 |
| 2012/0100806 A1* | 4/2012 | Hall | B60R 25/24 | 455/41.2 |
| 2012/0233674 A1* | 9/2012 | Gladstone | H04L 9/085 | 726/6 |
| 2012/0297458 A1* | 11/2012 | Tom | G06F 21/445 | 726/4 |
| 2012/0310447 A1* | 12/2012 | Toki | B60R 25/24 | 701/2 |
| 2013/0010960 A1* | 1/2013 | Ho | H04L 9/0637 | 380/270 |
| 2013/0036231 A1* | 2/2013 | Suumaki | H04W 12/04 | 709/228 |
| 2013/0099892 A1* | 4/2013 | Tucker | G07C 9/00309 | 340/5.61 |
| 2013/0173759 A1* | 7/2013 | Herse | G06F 21/34 | 709/219 |
| 2013/0205360 A1* | 8/2013 | Novak | H04L 63/102 | 726/1 |
| 2013/0259230 A1* | 10/2013 | Polo | H04L 63/0272 | 380/270 |
| 2013/0281021 A1* | 10/2013 | Palin | H04W 8/005 | 455/41.2 |
| 2013/0293349 A1* | 11/2013 | Templ | G07C 9/00111 | 340/5.61 |
| 2013/0339744 A1* | 12/2013 | Nagai | H04L 63/061 | 713/182 |
| 2014/0064486 A1* | 3/2014 | Abraham | H04W 12/04 | 380/270 |
| 2014/0079217 A1* | 3/2014 | Bai | H04L 63/0869 | 380/270 |
| 2014/0169564 A1* | 6/2014 | Gautama | G07C 9/00309 | 380/270 |
| 2014/0188348 A1* | 7/2014 | Gautama | B60W 10/30 | 701/48 |
| 2014/0232569 A1* | 8/2014 | Skinder | G01C 21/16 | 340/989 |
| 2014/0232570 A1* | 8/2014 | Skinder | G01C 21/165 | 340/989 |
| 2014/0274013 A1* | 9/2014 | Santavicca | G07C 9/00309 | 455/418 |
| 2014/0291395 A1* | 10/2014 | Wankmueller | G06Q 20/3278 | 235/381 |
| 2014/0325233 A1* | 10/2014 | Carlson | G06F 21/16 | 713/176 |
| 2014/0341373 A1* | 11/2014 | Song | H04L 9/0869 | 380/28 |
| 2014/0378057 A1* | 12/2014 | Ramon | H04L 9/32 | 455/41.2 |
| 2015/0049871 A1* | 2/2015 | Xie | H04W 12/08 | 380/270 |
| 2015/0163854 A1* | 6/2015 | Lee | H04W 88/08 | 370/328 |
| 2015/0177362 A1* | 6/2015 | Gutierrez | B60R 25/245 | 701/519 |
| 2015/0180661 A1* | 6/2015 | Fujii | H04L 9/30 | 380/46 |
| 2015/0188704 A1* | 7/2015 | Takenaka | H04L 9/0869 | 713/171 |
| 2015/0207626 A1* | 7/2015 | Neftel | G08C 17/02 | 713/168 |
| 2015/0271146 A1* | 9/2015 | Holyfield | H04L 63/0428 | 713/171 |
| 2015/0339334 A1* | 11/2015 | Hanke | G06F 17/30725 | 707/736 |
| 2015/0350176 A1* | 12/2015 | Mabuchi | H04L 9/3271 | 726/6 |
| 2015/0351145 A1* | 12/2015 | Burks | G08C 17/02 | 455/41.3 |
| 2015/0358814 A1* | 12/2015 | Roberts | H04W 12/06 | 713/169 |
| 2015/0359015 A1* | 12/2015 | Hrabak | H04W 4/80 | 709/227 |
| 2015/0371026 A1* | 12/2015 | Gnanasekaran | G06F 21/35 | 726/7 |
| 2016/0012653 A1* | 1/2016 | Soroko | G07C 9/00007 | 340/5.61 |
| 2016/0020905 A1* | 1/2016 | Poole | G06F 21/6227 | 713/184 |
| 2016/0050699 A1* | 2/2016 | Boss | H04L 67/12 | 455/41.2 |
| 2016/0066129 A1* | 3/2016 | Seidenberg | H04W 12/04 | 455/41.2 |
| 2016/0080357 A1* | 3/2016 | Daman | H04L 63/083 | 726/7 |
| 2016/0080940 A1* | 3/2016 | Pang | H04W 4/80 | 455/411 |
| 2016/0087950 A1* | 3/2016 | Barbir | H04L 63/062 | 713/171 |
| 2016/0100310 A1* | 4/2016 | Lee | H04W 4/70 | 713/171 |

(56) References Cited

U.S. PATENT DOCUMENTS

| | | | | |
|---|---|---|---|---|
| 2016/0127897 A1* | 5/2016 | Lee | ............ | H04L 63/06 |
| | | | | 713/176 |
| 2016/0150352 A1* | 5/2016 | Saed | ............ | H04W 4/80 |
| | | | | 455/41.2 |
| 2016/0171224 A1* | 6/2016 | Taratine | ............ | H04L 9/0894 |
| | | | | 713/182 |
| 2016/0212147 A1* | 7/2016 | Palin | ............ | H04L 63/062 |
| 2016/0225211 A1* | 8/2016 | Gehin | ............ | G07C 9/00309 |
| 2016/0234594 A1* | 8/2016 | Ogura | ............ | B60R 11/0247 |
| 2016/0241400 A1* | 8/2016 | Wolf | ............ | G06F 21/62 |
| 2016/0277923 A1* | 9/2016 | Steffey | ............ | H04W 12/04 |
| 2016/0309323 A1* | 10/2016 | Zarakas | ............ | H04W 12/06 |
| 2016/0353305 A1* | 12/2016 | Zakaria | ............ | H04M 1/72519 |
| 2016/0358389 A1* | 12/2016 | Menard | ............ | G07C 9/00309 |
| 2016/0360402 A1* | 12/2016 | Park | ............ | H04W 12/02 |
| 2017/0006004 A1* | 1/2017 | Li | ............ | H04L 63/061 |
| 2017/0019378 A1* | 1/2017 | Johnson | ............ | H04L 63/0428 |
| 2017/0099137 A1* | 4/2017 | Pang | ............ | H04L 63/00 |
| 2017/0118645 A1* | 4/2017 | Zarakas | ............ | H04W 12/06 |
| 2017/0308665 A1* | 10/2017 | Heck | ............ | A61B 5/14532 |

* cited by examiner

BLUETOOTH LOW ENERGY (BLE) COMMUNICATION BETWEEN A MOBILE DEVICE AND A VEHICLE

TECHNICAL FIELD

The present invention relates to communications between a vehicle and a mobile device using Bluetooth Low Energy (BLE).

BACKGROUND

One aspect of the Bluetooth Low Energy (BLE) protocol is that devices consume relatively low quantities of energy during its use. This may be desirable in vehicle implementations where the vehicle ignition may be off for extended periods of time. Thus, there exists a need to use the BLE protocol in vehicle applications while also maintaining sufficient wireless security (e.g., to avoid vehicle theft or the like).

SUMMARY

According to an embodiment of the invention, there is provided a method of communicating over a Bluetooth Low Energy (BLE) connection in a vehicle. The method includes the steps of: establishing a Bluetooth Low Energy (BLE) connection between a mobile device and a BLE system in the vehicle, wherein the establishing step includes receiving first credentials of the mobile device at the BLE system; providing second credentials to the mobile device from the vehicle, wherein the second credentials are different than the first credentials; and receiving a message from the mobile device that is encrypted using the first and second credentials.

According to another embodiment of the invention, there is provided a method of communicating over a Bluetooth Low Energy (BLE) connection in a vehicle. The method includes the steps of: establishing a Bluetooth Low Energy (BLE) connection between a mobile device and a BLE system in the vehicle, wherein the establishing step includes receiving first credentials of the mobile device at the BLE system; providing second credentials to the mobile device from the vehicle; generating third credentials for the mobile device, wherein the third credentials include a public key and a private key; providing the third credentials to the mobile device using the second credentials; and receiving a first message from the mobile device that is encrypted using the first and third credentials.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
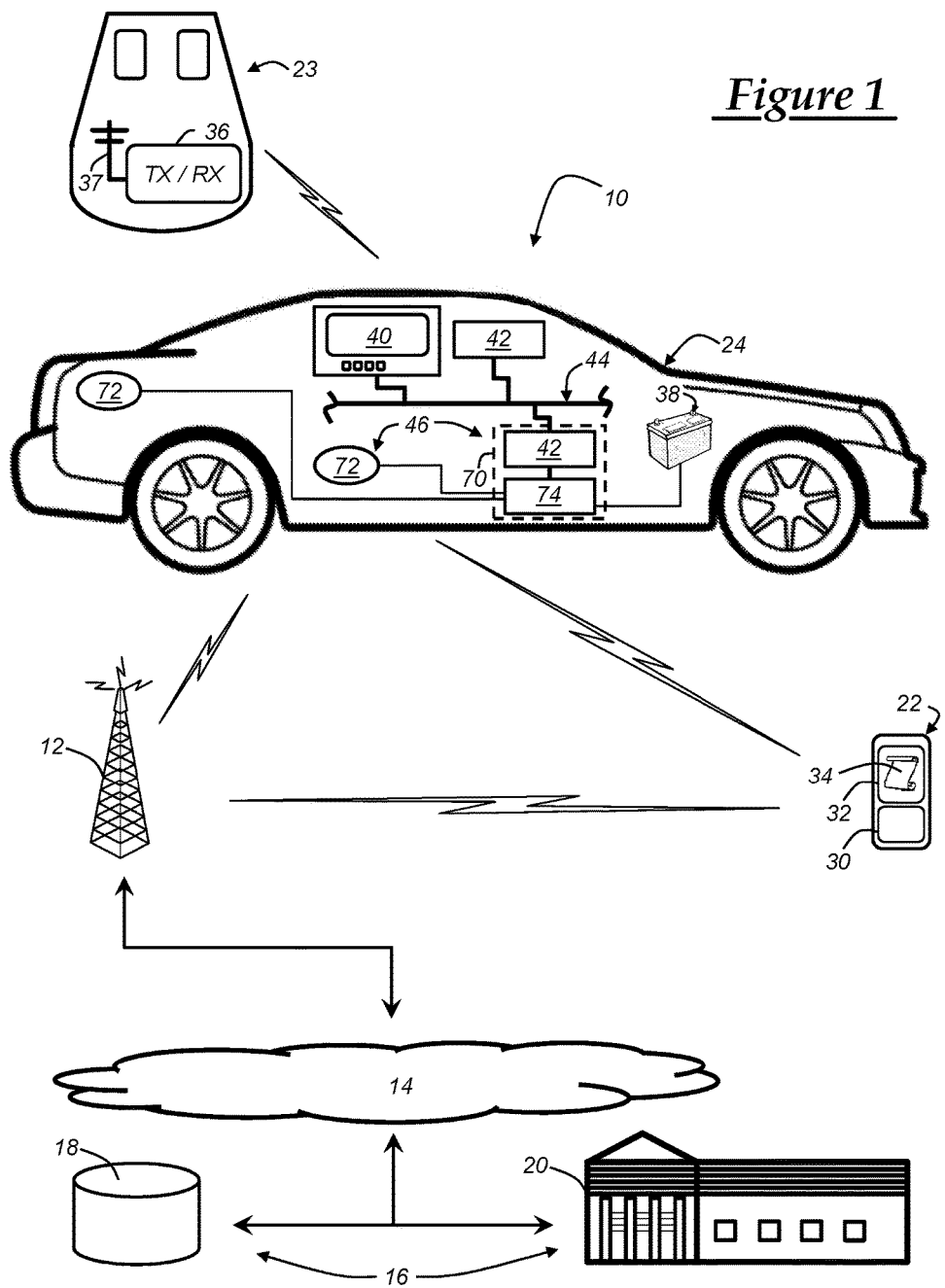
FIG. 1 is a block diagram depicting an embodiment of a communications system that is capable of utilizing the method disclosed herein.

The communication system described below pertains to communications between a vehicle Bluetooth Low Energy (BLE) system and a mobile device. In operation, the BLE system can enable the mobile device to remotely command a vehicle to perform one or more functions. For example using BLE, the mobile device may command a vehicle ignition event, lock and unlock vehicle doors, open vehicle doors (e.g., including the vehicle trunk, hood, etc.). BLE is a short range wireless communication (SRWC) protocol that consumes less energy than other SRWC protocols and is therefore suitable for vehicle applications in which limited vehicle battery power may exist. Thus, for example, use of the BLE protocol can be particularly desirable when the vehicle is in a listening or beaconing mode—e.g., and may be consuming power when the vehicle ignition is OFF— e.g., awaiting the return of a vehicle user with the mobile device. In this manner, the vehicle may conserve battery power to turn the vehicle ignition ON again when the user returns.

While the low energy consumption characteristics of BLE may be desirable for vehicle applications, without further protective measures, use of the BLE protocol in such vehicle applications makes the vehicle and user susceptible to security breaches due to a security issue associated with the BLE key exchange protocol. It has been discovered that the BLE key exchanged in accordance with the protocol developed by the Bluetooth Special Interest Group and released in version 4.0 of their specification can be obtained via a brute force method using a Intel Core i7 CPU in less than one second. Further, it is anticipated that this time could be reduced using other techniques (e.g., brute force in parallel, using processor-specific AES extensions, etc.).

Thus, the use of BLE is susceptible to eavesdropping, sniffing, etc. by a malicious party (e.g., an attacker or hacker). As will be appreciated by skilled artisans, a malicious party may sniff or otherwise determine the credentials used by the BLE protocol (e.g., between two devices). Thus, in a vehicle application, the malicious attacker could potentially acquire the BLE credentials and—without additional security measures—spoof mobile device transmissions misleading the BLE system in the vehicle. Based on spoofed communications, the vehicle may perform a vehicle function presuming it to be authorized (e.g., unlocking a vehicle door and/or remotely starting the vehicle). The system discussed below—and its associated method(s)—provide a secure way for the vehicle and the mobile device to communicate with one another despite the known security weaknesses of the BLE protocol.

The method described below uses an out-of-band communication to provide the mobile device with secondary credentials (i.e., non-BLE credentials). As will be discussed more below, the out-of-band communication could include using a different SRWC protocol to provide the secondary credentials (or providing a code printed in the vehicle or displayed to a vehicle user, just to name a few examples). Once the mobile device and vehicle have the secondary credentials, both devices may encrypt future communications using the secondary credentials, but still utilize the BLE protocol—taking advantage of the low power consumption characteristics of BLE. For example, the mobile device and BLE system may send a message first encrypted using the secondary credentials (e.g., an encrypted payload), which is also protected at least to some degree by the BLE credentials (e.g., the payload is further encrypted using the BLE credentials). In this manner, should a malicious attacker acquire or intercept the message and decrypt the BLE credentials, the message will still be an encrypted payload (e.g., still encrypted by the secondary credentials). Thus, the method provides confidentiality, as any intercepted communication will be unintelligible to the malicious attacker.

Following a description of the communication system and the BLE system, one or more embodiments of this summarized method will be described in greater detail below.

Communications System—

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; a secondary wireless device 23 (e.g., a keyfob); and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as LTE, CDMA (e.g., CDMA2000), or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

Mobile device 22 may be any electronic device capable of cellular voice and/or data calls across a wide geographic area where transmissions are facilitated by the wireless carrier system 12. It may be configured to provide cellular services according to a subscription agreement with a third-party facility such as a wireless service provider (WSP). In addition, mobile device 22 may be electronically coupled to the vehicle 24 by wire or wirelessly via short-range wireless communication (SRWC) protocol (e.g., Wi-Fi Direct, Bluetooth, Bluetooth Low Energy (BLE), Near-Field Communication (NFC), etc.).

Mobile device 22 includes a user interface coupled to a processor 30 which is configured to execute an operating system (OS) stored on mobile device memory 32 (e.g., on a non-transitory computer readable medium of the device). The processor 30 further may execute one or more software applications 34 stored in device memory as well. Using such applications, a vehicle user may remotely control or communicate with vehicle 24, the backend system 16, or both (e.g., via cellular communication, SRWC, or both). For example, one application may enable the user to remotely lock/unlock vehicle doors, turn the vehicle on/off, check the vehicle tire pressures, fuel level, oil life, etc. According to one embodiment, application 34 may perform at least some of the method steps described herein—e.g., receiving, storing, and using credentials provided by the vehicle 24, the backend system 16, or the like. This will be described in greater detail below.

Non-limiting examples of the mobile device 22 include a cellular telephone, a personal digital assistant (PDA), a Smart phone, a personal laptop computer or tablet computer having two-way communication capabilities, a netbook computer, a notebook computer, or any suitable combinations thereof. The mobile device 22 may be used inside or outside of vehicle 24 by a vehicle user who may be a vehicle driver or passenger. It should be appreciated that the user does not need to have ownership of the mobile device 22 or the vehicle 24 (e.g., the vehicle user may be an owner or a licensee of either or both).

Secondary wireless device 23 may be any suitable wireless transmitter or transceiver which is adapted to communicate with vehicle 24 via a short range wireless communication (SRWC) protocol. In at least one embodiment, device 23 comprises a keyfob associated with vehicle 24—the keyfob including any suitable software, circuitry 36, or both, as well as an antenna 37 adapted to communicate with vehicle 24. Suitable SRWC protocols include Bluetooth, Bluetooth Low Energy (BLE), Wi-Fi, and Near-Field Communication (NFC), just to name a few non-limiting examples. In at least one embodiment, secondary wireless device 23 communicates via Bluetooth. As will be appreciated by skilled artisans, device 23 may communicate a number of preconfigured commands to vehicle 24 (e.g., a lock doors command, an unlock door(s) command, an initiate ignition event (start vehicle engine), a terminate ignition event (turn OFF engine), etc.). As will be explained below, in at least one embodiment, a determination of the proximity of the secondary wireless device 23 by the vehicle 24 is used to enhance security during vehicle (24)-to-mobile device (22) communication.

Vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include a number of electrical components, including but not limited to a vehicle power source or battery 38, a vehicle infotainment unit 40, and one or more vehicle system modules 42. Some components, such as the VIS 40 and VSMs 42 may be coupled to one or more network connections 44 (e.g., a bus, as will be described below). In addition, at least one VSM 42 may be part of a vehicle BLE system 46 which is used to carry out at least a portion of the method described herein.

In at least one implementation, power source 38 may be a conventional vehicle battery. In the embodiment shown, battery 38 is coupled to the BLE system 46 (e.g., to directly provide power to one or more components of the BLE system 46, even when vehicle 24 ignition is OFF). Of course, battery 38 may be coupled to other devices and components in vehicle 24 as well.

Figure 3A:
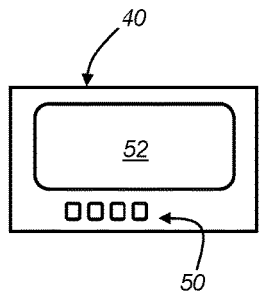
FIGS. 3A-3C illustrate examples of out-of-band communication techniques.

Vehicle infotainment system (VIS) 40 may comprise a user interface for input/output (I/O) 50 and a display 52 (see also FIG. 3A). VIS 40 may be used to provide a number of vehicle services to users of vehicle 24 (e.g., non-limiting examples include audio data, video data, multi-media data, etc.). Display 52 may be one of a plurality of displays in vehicle 24 and is intended to be illustrative of any suitable display in the vehicle which may be used to provide information to a vehicle user. As will be described below, in at least one implementation, the display 52 of VIS 40 may be used to provide an out-of-band communication associated with secondary credentials to the mobile device 22.

Figure 3B:
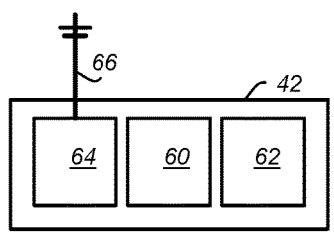

In FIG. 1, vehicle system modules (VSMs) 42 may be any suitable hardware modules in the vehicle configured to perform one or more different vehicle functions or tasks—each VSM 42 having one or more processors 60 and memory devices 62, as illustrated in one example shown in FIG. 3B. The VSM in FIG. 3B is a vehicle telematics unit having at least one communication circuit 64 and antenna 66. The communication circuit 64 may include one or more wireless chipsets and may enable the vehicle to perform cellular communication over wireless carrier system 12, short range wireless communication (SRWC) with devices such as mobile device 22 or keyfob 23, or any combination thereof. Of course, a telematics unit is merely an example of a VSM. It will be appreciated that other VSMs 42 may not have communication circuits 64 or antennas 66 (and may have other suitable features instead). Non-limiting examples of VSMs include: an engine control module (ECM) that controls various aspects of engine operation such as fuel ignition and ignition timing; a powertrain control module (PCM) that regulates operation of one or more components of the vehicle powertrain; and a body control module (BCM) that governs various electrical components located throughout the vehicle, like the vehicle's power door locks and headlights. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

Returning to FIG. 1, network connections 44 include any wired intra-vehicle communications system for connecting or coupling the VSMs 42 and other vehicle electronic devices to one another. According to one embodiment, the network connection 44 comprises a data bus (e.g., a communication bus, entertainment bus, etc.). Non-limiting examples of suitable network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few.

Figure 2:
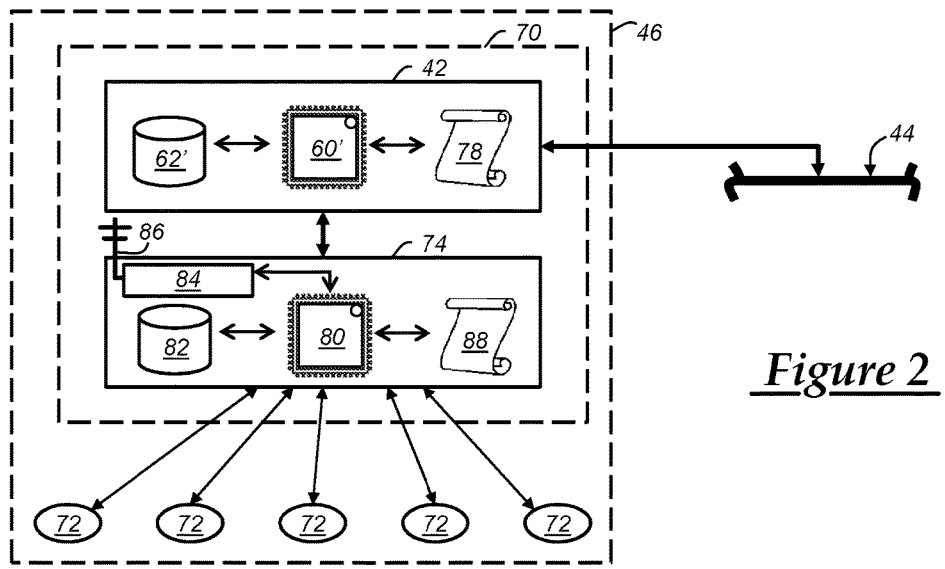
FIG. 2 is a schematic diagram of a vehicle Bluetooth Low Energy (BLE) system.

BLE system 46 can comprise any suitable components for communicating with intra- and extra-vehicle devices over the Bluetooth Low Energy (BLE) protocol. As shown in FIGS. 1-2, in at least one embodiment, the BLE system 46 comprises a BLE manager 70 and one or more sensors 72. The BLE manager 70 comprises at least one VSM 42 and a central BLE module or node 74. The VSM 42 and central BLE module 74 may be a single hardware unit or may be two separate, electrically coupled hardware devices which cooperatively work together to carry out at least some of the steps of the method described herein. For example, BLE manager 70 may receive wireless BLE data (via BLE module 74 from sensors 72), decipher the received data (at the BLE module 74 or VSM 42), and when appropriate, command vehicle 24 to perform a command associated with the received and deciphered data (via VSM 42 or another VSM). In at least one implementation, VSM 42 could be the ECM or the BCM previously described—by way of illustration and not limitation, the BCM is described below as part of the BLE manager 70. Of course, it should be appreciated that other VSMs 42 also could be used with the BLE manager 70 (instead of or in addition to the BCM).

The BCM 42 shown in FIG. 2 is coupled to bus 44 and includes a processor 60', memory 62', and operational instructions 78 (which may be embodied as software programs, firmware programs, or the like). The processor 60' can be any type of device capable of processing electronic instructions including microprocessors, microcontrollers, host processors, controllers, vehicle communication processors, and application specific integrated circuits (ASICs). It can be a dedicated processor used only for BCM 42, or it can be shared with other vehicle systems. Processor 60' executes digitally-stored instructions 78, which may be stored in memory 62', which enable the BCM 42 to perform one or more vehicle functions (e.g., to actuate vehicle lighting and power door locks—between locked and unlocked states). As will be explained in greater detail below, processor 60' can execute programs or process data to carry out at least a part of the method discussed herein.

The memory 62' may include any non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

In FIG. 2, BLE module 74 is shown coupled to BCM 42 and the one or more sensors 72. BLE module 74 also may comprise a processor 80, memory 82, and digitally-stored instructions 88 (e.g., software programs, firmware programs, or the like). Processor 80 and memory 82 may be of similar type and may have similar characteristics and qualities as that of processor 60' and memory 62', and therefore will not be explained in greater detail. For example, memory 82 also may be a non-transitory computer readable medium. However, it will be appreciated that processor 80 and memory 82 may be specially adapted to carry out the processes and methods associated with BLE module 74 (rather than the BCM previously described). In at least one embodiment, the computing or processing power of the BLE module 74 is substantially less than that of the BCM 42. Also, in at least one embodiment, the processor(s) 80 and memory 82 may execute one or more steps of the method embodiments contemplated herein. For example, the method(s) may be performed as one or more computer programs executable by one or more computing devices of or in communication with the BLE module 74 to cause the BLE module and/or its respective computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files.

In addition, BLE module 74 may include a transceiver 84 and antenna 86. The transceiver 84 and antenna 86 may be adapted to communicate wirelessly with one or more of the sensors 72. In some implementations, the transceiver 84 is adapted to receive signal data from the sensors 72 (wirelessly or by wire) and then transmit that signal data to the BCM 42 (e.g., by wire). In other implementations, the transceiver 84 is adapted to transmit signal data to sensors 72 (wirelessly or by wire) so that the sensors 72 may re-transmit the signal data (e.g., to mobile device 22). Thus, while FIG. 1 illustrates the sensors 72 being wired to the BLE module 74, embodiments exist where the sensors 72 and BLE module 74 are in wireless communication instead.

Figure 4:
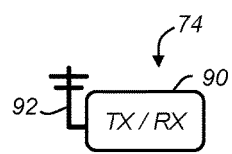
FIG. 4 is a schematic diagram of a vehicle sensor.

Sensor 72 may be any suitable sensor in the vehicle 24. Each sensor 72 may comprise a transmitter 90 and associated antenna 92 (see FIG. 4). In at least one implementation, the transmitter 90 is also a transceiver (e.g., capable of both transmitting and receiving wireless data). In at least on implementation, sensor(s) 72 are configured to communicate via the BLE protocol. In other implementations, the sensor(s) 72 may communicate via other protocols as well (e.g., Bluetooth). For example, in one implementation, sensor 72 is located in a door panel and is adapted to sense the proximity of the secondary wireless device 23 via BLE, Bluetooth, or both. In another implementation, a sensor 72 may be adapted to communicate with mobile device 22 via BLE or another SRWC protocol. Thus, in at least some implementations, sensors 72 can be configured for communicating via multiple protocols.

In at least one vehicle embodiment, a plurality of sensors 72 are distributed in different regions of the vehicle. For example, sensors 72 may be located fore and aft, driver side and passenger side, and/or therebetween. This distribution of sensors may provide redundancy, enable the BLE system 46 to determine the proximity or location of a user, or both.

It should be appreciated that while the BCM 42 is shown as part of the BLE system 46, this is merely an example. For example, the ECM alternatively be part of the system 46 (e.g., to enable remote vehicle ignition or the like). Or the BCM and ECM could both be part of the BLE system 46 (e.g., part of the BLE manager 70). Again, the BCM and ECM are merely examples; other VSMs 42 also could operate as part of the BLE manager 70.

Method—

Figure 5:
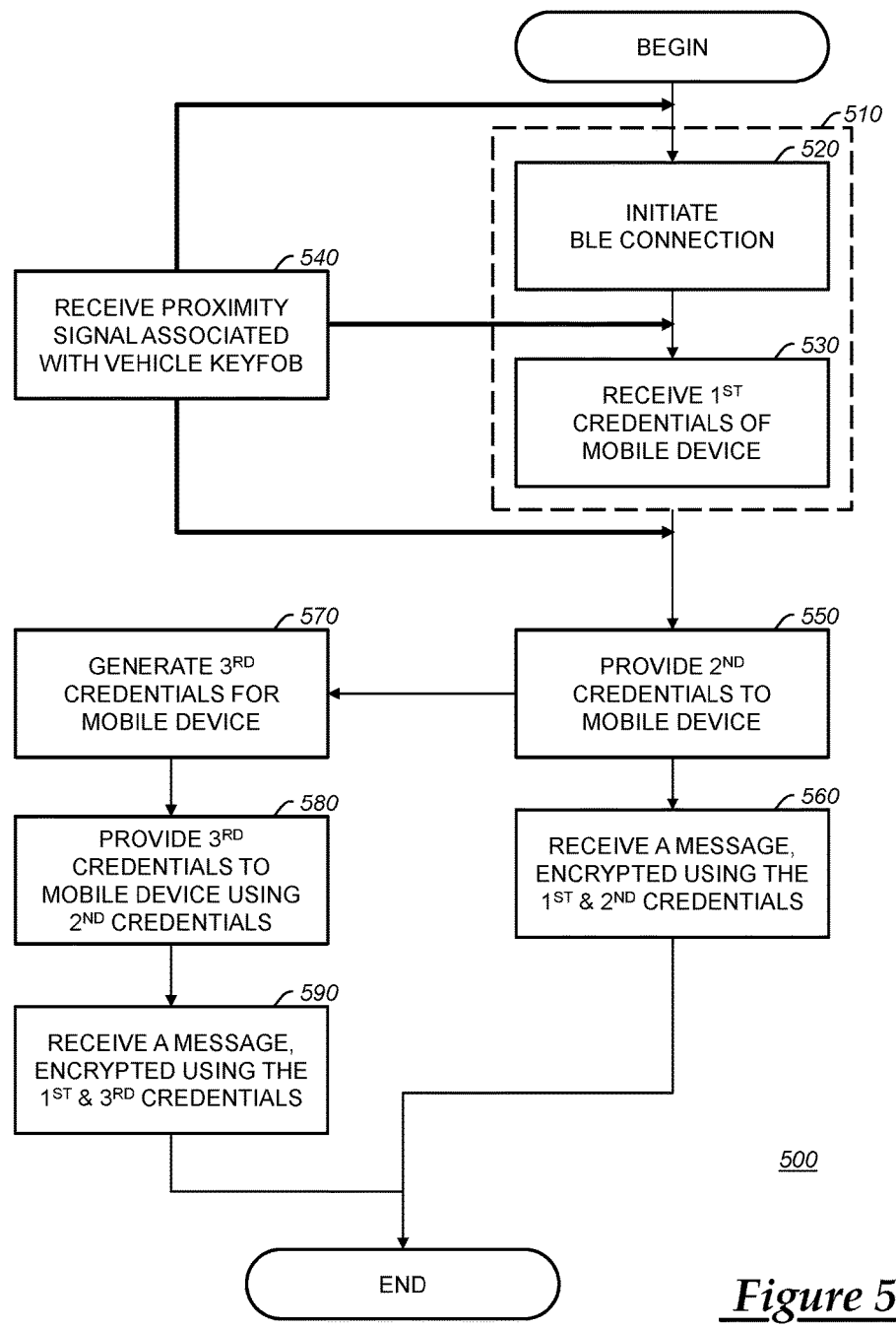
FIG. 5 is a flow diagram illustrating a method of using the BLE system shown in FIG. 2.

Turning now to FIG. 5, there is shown a method 500 for communicating via a BLE connection in the vehicle 24. In one embodiment, the method begins with step 510 which includes establishing a BLE connection between mobile device 22 and BLE system 46. Step 510 may include multiple parts; e.g., step 520 (initiating a BLE connection) and step 530 (receiving first credentials).

In step 520, the vehicle 24 may be in a discoverable mode enabling a new BLE connection (i.e., with mobile device 22). Discoverable mode may be prompted by a vehicle user (e.g., interacting with the vehicle—e.g., via VIS 40), prompted or carried out by a computer or live advisor at the data service center 20 (e.g., using the vehicle telematics unit), or the like. Once initiated, the method proceeds to step 530.

In step 530, the BLE manager 70 (e.g., more specifically, the BLE module 74) receives a first set of credentials via one or more sensors 72 upon the establishment of a BLE connection with mobile device 22. These first credentials may include a key to be used by the BLE manager 70 to decrypt messages or communications received from the mobile device 22 (or the first credentials may be used to encrypt messages to be sent from the vehicle 24 to mobile device 22). In at least one embodiment, the BLE system 46 stores the first credentials in memory 82 (of BLE module 74). Similarly, any associated credentials also may be stored in mobile device memory 32. In at least one embodiment, the first credentials are a shared key; however, this is merely an example. In this manner, the BLE system 46 and mobile device 22 may be paired or bonded with one another— enabling both devices to send and receive information via the BLE protocol in accordance with conventional BLE cryptography (e.g., signed or encrypted with the first credentials or associated first credentials). Following step 530, the method may proceed to step 550.

FIG. 5 illustrates that a step 540 may occur prior to step 510, occur during step 510 (e.g., interposed between steps 520 and 530), or occur following step 530 (but before step 550). Step 540 comprises receiving at the BLE system 46 an indication of the proximity of the secondary wireless device 23 with respect to the vehicle (e.g., that the vehicle keyfob is relatively nearby). When the keyfob 23 communicates via SRWC, the BLE system 46 may receive an indication of a wireless signal sent from keyfob 23. This may occur because the BLE system 46 directly receives the communication (e.g., via BLE). Or it may occur as the keyfob 23 communicates via another protocol (e.g., Bluetooth) with another vehicle device (e.g., the telematics unit).

Regardless of how the BLE system 46 receives an indication of the proximity of the keyfob 23, when the signal strength of the fob 23 exceeds a predetermined threshold, it may be determined that the keyfob 23 is proximate the vehicle 24. In some embodiments, the BLE system 46 may require an indication of the keyfob's proximity prior to executing step 510—e.g., not initiating BLE communication with the mobile device 22 without a concurrent indication of keyfob 23 proximity. The proximity of the keyfob 23 may satisfy a presumption that an authorized user of the mobile device 22 is performing the bonding (i.e., of mobile device 22 to BLE system 46). In implementations having a keyed ignition, keyfob 23 may provide a wired signal (e.g., at the ignition) or a wireless signal (e.g., via a chip in the keyfob). And in implementations having a keyless ignition, keyfob 23 may provide only a wireless signal.

In other embodiments, the BLE system 46 may require an indication of the proximity of the keyfob 23 prior to executing step 530—e.g., not allowing the transmission of the first credentials between the mobile device 22 and BLE system 46 without first receiving such an indication (or without first receiving a concurrent indication).

In yet other embodiments, the BLE system 46 may require a concurrent indication of the proximity of the keyfob 23 prior to executing step 550—e.g., not providing additional credentials without an indication that the user of the mobile device 22 is authorized to receive them (again, authorization may be implied when the keyfob 23 is proximate the vehicle 24 at the same time step 550 is executed). It also should be appreciated that, in some embodiments, step 540 may be omitted. However, where step 540 is included, method 500 ends without the indication of the proximity of the keyfob 23.

In the examples above, step 540 was described as occurring at one of several different times (e.g., before step 520, between steps 520 and 530, and after step 530). It should be appreciated that step 540 could occur at any combination of these times as well. In at least one embodiment, the keyfob 23 is proximate vehicle 24 at each of these instances.

Returning to step 550, vehicle 24 provides a second set of credentials to the mobile device 22. As discussed above, the first or BLE credentials have known weaknesses, which if used alone, could make the vehicle 24 and user susceptible to a malicious attack. The use of second credentials enables the payload of future messages to be encrypted using both the first and second credentials—making it much less likely that any malicious attacker will be successful in determining the contents of any message or communication between the vehicle BLE system 46 and mobile device 22 via BLE.

Figure 3C:
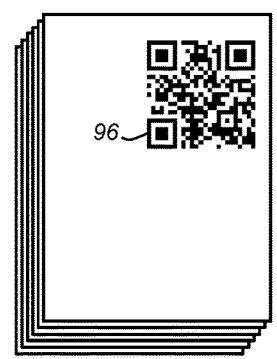

In at least one implementation, providing the second credentials occurs via an out-of-band (OOB) communication. FIGS. 3A, 3B, and 3C at least partially illustrate several ways this OOB communication may occur. For example, in FIG. 3A, a code associated with the second credentials may be displayed on the VIS display 52 (e.g., a numerical, alphabetical, alphanumeric, etc. code). Of course, the code may be provided with visual or audible instructions (for the user). According to another embodiment, the code could be provided to display 52 via the backend system 16 (e.g., using a live advisor or automated, interactive computer). In at least one implementation, this may be JustWorks™. In another implementation, this may be a six-digit personal identification number (PIN) or the like (having a value between 0 and 999,999). These of course are all merely examples and other codes or code values may be provided.

FIG. 3B illustrates one exemplary VSM 42 having communication capabilities—e.g., the telematics unit. Thus, the telematics unit may be used to provide the code to the mobile device 22. This could be transmitted from vehicle 24 to mobile device 22 directly (e.g., via a SRWC that is secure) or via wireless carrier system 12 (e.g., via a cellular voice or data call). Or the telematics unit 42 could communicate with backend system 16, and backend system 16 could transmit the code or second credentials to mobile device 22 via a secure connection.

FIG. 3C illustrates that the code could be provided in the vehicle 24 as a sensor (e.g., a radio frequency identification (RFID) tag) or cipher interpretable by the user's mobile device 22. In the example of FIG. 3C, a manual 94 could include a label having a QR code 96 representative of the secondary credentials. Of course, mobile device 22 may scan and read the QR code 96 and determine the secondary credentials. The manual 94 is illustrative of course, as is the QR code. For example, any suitable code could be provided to the user using a label (e.g., on the inside of the glovebox, received via a secure internet website, etc.).

In at least one embodiment, second credentials include a shared or symmetric key which can be used to encrypt or decrypt communications between mobile device 22 and the vehicle 24 (which may hold the only other identical key). Skilled artisans will appreciate the construction of shared (symmetric) keys and the techniques which may be employed to generate or decipher digital messages using them. Following step 550, method 500 proceeds to step 560.

In step 560, the mobile device 22 sends a message to the vehicle 24. The message is encrypted using both the first and second credentials. In at least one example, the message is first encrypted using the second credentials (e.g., the shared key). This encrypted message then serves as the payload to be encrypted using the first credentials (i.e., the credentials generated in accordance with the BLE protocol). Therefore, should a malicious attacker sniff or eavesdrop and thereby intercept the message, the attacker might be able to acquire the payload of the BLE message (having hacked the first credentials); however, the payload contents will remain confidential and the efforts of the attacker will be frustrated—as the malicious attacker will be unable to decrypt or determine the payload contents encrypted by the second credentials.

In method 500, it is anticipated that the BLE system 46 can decrypt the message signed using the second credentials; e.g., this may occur at the BCM 42 (e.g., the shared key (of the second credentials) may be stored in memory 62' and used by BCM 42 for encryption/decryption). Further, it is anticipated that the vehicle 24 may send messages to mobile device 22, and mobile device would first decrypt the BLE credentials (the first credentials), and then decipher the message by decrypting the second credentials (e.g., the reverse of step 560). When BLE system 46 receives a message signed using both the first and second credentials, the BLE module 74 may extract the payload. Then, the message still encrypted with the second credentials may be sent to the BCM 42 which decrypts the payload and/or executes any vehicle command associated with the decrypted message.

In at least one embodiment, method 500 may not proceed to step 560 from step 550; instead, method 500 may proceed from step 550 to step 570. For example, once the BLE manager 70 and mobile device 22 exchange or provide second credentials to one another, the BLE system 46 may perform step 570 by generating a third set of credentials specifically for the mobile device 22. In at least one implementation, the third credentials are according to a public key infrastructure (PKI)—i.e., the vehicle 24 may generate a private key and a public key for mobile device 22. Following step 570, method 500 proceeds to step 580.

In step 580, the third credentials are provided wirelessly to mobile device using the second credentials. For example, BLE manager 70 prepares a message for mobile device 22—the payload comprises at least the private key. The payload could include the public key as well (or the public key could be sent at a later time with or without encryption). Once the payload is encrypted using the second credentials, it may further be encrypted using the first/BLE credentials. Then, the message is sent to mobile device 22 via BLE.

Next, in step 590, the message is received by mobile device 22 and decrypted. The private key may be stored in memory 32 and may be accessible when using software 34 (e.g., on the mobile device). Step 590 comprises the mobile device 22 sending a message to vehicle 24 using the third credentials. More specifically, the message may be signed with the third credentials (the payload), and then the payload may be signed using the first/BLE credentials.

Upon receipt at the vehicle 24, the message may be decrypted using the public key (also generated by the vehicle 24). The vehicle 24 also may store/use a different private key. For example, a VSM 42 may generate a PKI pair for the vehicle 24 as well (fourth credentials)—thus, the vehicle will have its own private key and associated public key. The BLE system 46 may provide the public key (of the fourth credentials) to mobile device 22 and other entities, as desirable. In this manner, all message traffic sent via a BLE connection between the vehicle 24 and mobile device 22 may have two layers of encryption: using BLE credentials and second credentials, using BLE credentials and third credentials, or using BLE credentials and fourth credentials. Therefore, regardless of a breach of the BLE credentials, another layer of encryption will be manifest to the malicious attacker—and the malicious attacker will not be able to determine the contents of the BLE communication.

In at least one embodiment, the shared key (second credentials) may no longer be used once the PKI infrastructure is in place between the mobile device 22 and BLE system 46.

Other implementations also exist. For example, in implementations using the shared key (e.g., steps 550-560), the BLE or first credentials and the shared or second credentials may have the same cryptographic building blocks (or primitive). For example, the primitive of the shared key may be associated with AES-CCM (Advanced Encryption Standard Counter with Cipher Block Chaining Message Authentication Code), which may be the same as the BLE credentials. By using the same primitive, the same specially-configured cryptographic hardware may be used for the first (BLE) credentials and the second credentials (the shared key), a similar or same computing speed may be achieved, and a similar or same power consumption may be realized when encrypting/decrypting.

In still other implementations, other cryptographic protocols may be used (e.g., other than AES-CCM). For example, protocols associated with the Transport Security Layer (TLS) or Datagram TLS (DTLS). Both TLS and DTLS would enable use of the first (BLE) credentials and the second credentials (the shared key) and would support an out-of-band key exchange. These are merely examples; other implementations also exist.

Thus, there has been described a communication system that enables a secure BLE connection between a mobile device and a vehicle. The vehicle and the mobile device may have shared credentials which add additional security to BLE communications. The shared credentials may be acquired by the mobile device via an out-of-band communication. In another implementation, the mobile device may use a private key to digitally sign messages sent to the vehicle—and this private key may be generated at the vehicle and be provided to the mobile device via the shared credentials. In yet another implementation, the vehicle may use a different private key to digitally sign messages sent to the mobile device. In all implementations, communications between the vehicle and mobile device may have at least two layers of security—a payload signed using either a shared key or a private key, wherein the payload further is encrypted using BLE credentials.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating over a Bluetooth Low Energy (BLE) connection in a vehicle, comprising the steps of:

establishing a Bluetooth Low Energy (BLE) connection between a mobile device and a BLE system in the vehicle, wherein the establishing step includes receiving first credentials of the mobile device at the BLE system;

providing second credentials to the mobile device from the vehicle via out-of-band communication, wherein the second credentials are different than the first credentials; and receiving a message that is encrypted from the mobile device via the BLE connection, wherein at least a portion of the message is first encrypted with a non-BLE encryption key and then encrypted with a BLE encryption key, wherein the BLE encryption key is at least part of the first credentials or is derived from the first credentials, and wherein the non-BLE encryption key is at least part of the second credentials or is derived from the second credentials.

2. The method of claim 1, wherein providing the second credentials includes at least one of: displaying a code on a vehicle display, providing a QR code in the vehicle, or using a short-range wireless connection (SRWC) other than BLE.

3. The method of claim 1, wherein the BLE system includes a vehicle system module (VSM) and a BLE module, wherein the second credentials are stored in the VSM.

4. The method of claim 3, wherein the VSM is a body control module (BCM).

5. The method of claim 1, further comprising receiving a proximity signal from a third device at the VSM indicating the presence at the vehicle of the third device.

6. The method of claim 5, wherein, when the third device is associated with a keyed ignition of the vehicle, the proximity signal is wired or wireless, and wherein, when the third device is associated with a keyless ignition of the vehicle, the proximity signal is wireless.

7. The method of claim 5, further comprising at least one of the following:
based on receiving the proximity signal, performing the establishing step; or
based on receiving the proximity signal, performing the providing step.

8. The method of claim 1, wherein the second credentials comprises a symmetric key.

9. The method of claim 1, wherein the first and second credentials are associated with AES-CCM (Advanced Encryption Standard Counter with Cipher Block Chaining Message Authentication Code).

10. A method of communicating over a Bluetooth Low Energy (BLE) connection in a vehicle, comprising the steps of:
establishing a Bluetooth Low Energy (BLE) connection between a mobile device and a BLE system in the vehicle, wherein the establishing step includes obtaining first credentials for encrypting communications with the mobile device at the BLE system;
providing second credentials to the mobile device from the vehicle;
generating third credentials for the mobile device at the vehicle, wherein the third credentials include a public key and a private key;
after establishing the BLE connection, providing a first message containing either or both of the public key and the private key of the third credentials to the mobile device, wherein the first message is encrypted using at least part of the second credentials or information derived from the second credentials; and
receiving a second message from the mobile device that is encrypted with two or more encryption keys using one or more encryption layers, wherein the one or more encryption keys include at least part of the first credentials or information derived from the first credentials, and wherein the one or more encryption keys further include at least part of the public key or the private key of the third credentials.

11. The method of claim 10, further comprising sending to the mobile device a response message in response to receiving the second message, wherein the response message is encrypted using the first credentials and fourth credentials, wherein the fourth credentials are stored at the vehicle.

12. The method of claim 11, wherein the fourth credentials include a public key and a private key.

13. The method of claim 10, wherein, following providing the first message to the mobile device, future wireless communications between the mobile device and the vehicle do not use the second credentials.

14. A method of communicating over a Bluetooth Low Energy (BLE) connection in a vehicle, comprising the steps of:
establishing a Bluetooth Low Energy (BLE) connection between a mobile device and a BLE system in the vehicle, wherein the establishing step includes obtaining first credentials at the BLE system based on one or more BLE signals, wherein the first credentials are created pursuant to a standard BLE protocol;
providing second credentials to the mobile device, wherein the second credentials are provided without using the standard BLE protocol, and wherein the first credentials and the second credentials are built using cryptographic building blocks that are the same as the cryptographic building blocks associated with AES-CCM (Advanced Encryption Standard Counter with Cipher Block Chaining Message Authentication Code);
receiving a first message from the mobile device, wherein the first message includes an encrypted payload that contains message contents and that was encrypted using the second credentials, and wherein the first message is encrypted using the first credentials pursuant to the standard BLE protocol;
decrypting the first message from the mobile device using the first credentials and thereby obtaining the encrypted payload of the first message; and
decrypting the encrypted payload of the first message using the second credentials and thereby obtaining the message contents of the first message.

* * * * *